(12) United States Patent
An (10) Patent No.: US 6,859,669 B2
(45) Date of Patent: Feb. 22, 2005

(54) APPARATUS AND METHOD OF CONTROLLING ACTIVATION OF HOME AUTOMATION SYSTEM

(75) Inventor: Sang-Man An, Hwasung (KR)

(73) Assignee: Samsung Electronics Co., LTD, Suwon-Si (KR)

( * ) Notice: Subject to any disclaimer, the term of this patent is extended or adjusted under 35 U.S.C. 154(b) by 244 days.

(21) Appl. No.: 10/226,186

(22) Filed: Aug. 23, 2002

(65) Prior Publication Data

US 2003/0085795 A1 May 8, 2003

(30) Foreign Application Priority Data

Nov. 8, 2001 (KR) .......................................... 2001-69433

(51) Int. Cl.⁷ ............................................. G05B 11/01
(52) U.S. Cl. ............................. 700/19; 700/20; 700/65; 700/66; 700/275; 700/276; 700/277; 700/278; 236/1 B; 236/1 C; 165/200; 165/11.2; 340/309.3; 340/309.4; 340/310.02
(58) Field of Search ............................. 700/19, 20, 65, 700/66, 275, 276, 277, 278; 236/1 B, 1 C; 165/200, 11.2; 340/310.02, 309.3, 309.4

(56) References Cited

U.S. PATENT DOCUMENTS

| | | | | |
|---|---|---|---|---|
| 5,086,385 A | * | 2/1992 | Launey et al. ................ 700/83 |
| 5,621,662 A | * | 4/1997 | Humphries et al. .......... 700/276 |
| 5,622,221 A | * | 4/1997 | Genga et al. ................ 165/208 |
| 5,904,047 A | * | 5/1999 | An ................................. 62/81 |
| 6,192,282 B1 | * | 2/2001 | Smith et al. .................... 700/19 |
| 6,218,931 B1 | | 4/2001 | Asghar et al. .......... 340/310.02 |
| 6,241,156 B1 | * | 6/2001 | Kline et al. ................. 236/49.3 |
| 6,415,023 B2 | * | 7/2002 | Iggulden ................. 379/102.03 |
| 2002/0047775 A1 | * | 4/2002 | del Castillo et al. ........ 340/3.54 |
| 2002/0083342 A1 | * | 6/2002 | Webb et al. ................. 713/201 |
| 2002/0118796 A1 | * | 8/2002 | Menard et al. ................ 379/45 |
| 2003/0084928 A1 | * | 5/2003 | Wood ........................ 134/58 D |

* cited by examiner

Primary Examiner—Ramesh Patel
(74) Attorney, Agent, or Firm—Staas & Halsey LLP (57) ABSTRACT

An apparatus controlling activation of a home automation system to prevent electric home appliances from being simultaneously activated. The activation control apparatus has an activation control unit receiving an activation instruction for a first electric home appliance from a user, and activating the first electric home appliance, after at least one other electric home appliance is activated and lapse of a predetermined delay time, thus preventing simultaneous activation of the electric home appliances by sequentially activating the electric home appliances. The activation control unit has a user interface terminal and a gateway processor.

11 Claims, 6 Drawing Sheets

| ELECTRIC HOME APPLIANCE CODE | PRIORITY |
|---|---|
| 0001 | P1 |
| 0010 | P3 |
| 0011 | P2 |
| 0100 | P4 |
| ⋮ | ⋮ |

APPARATUS AND METHOD OF CONTROLLING ACTIVATION OF HOME AUTOMATION SYSTEM

CROSS-REFERENCE TO RELATED APPLICATIONS

This application claims the benefit of Korean Application No. 2001-69433 filed Nov. 8, 2001, in the Korean Intellectual Property Office, the disclosure of which is incorporated herein by reference.

BACKGROUND OF THE INVENTION

1. Field of the Invention

The present invention relates generally to an apparatus and method of controlling activation of a home automation system, and more particularly, to an apparatus and method of controlling activation of a home automation system, which sequentially activates a plurality of electric home appliances to prevent the electric home appliances from being simultaneously activated.

2. Description of the Related Art

Figure 1:
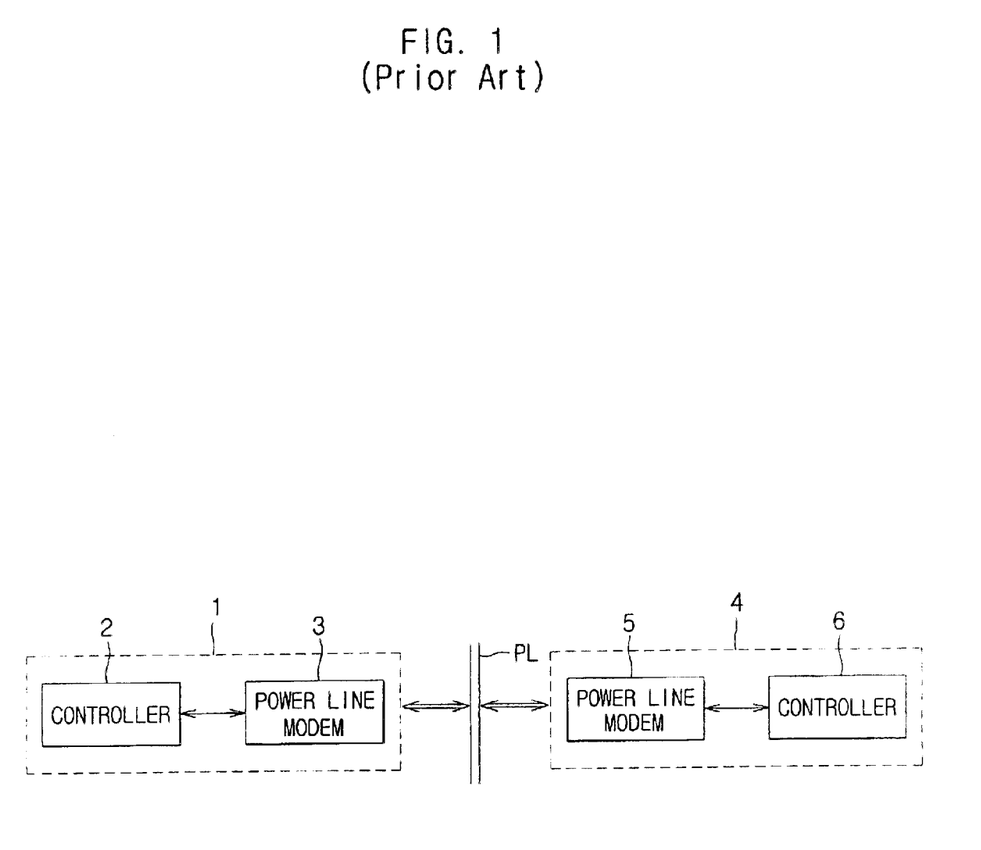
FIG. 1 is a block diagram showing a mutual relationship between an electric home appliance and a gateway processor in a conventional home automation system.

FIG. 1 is a block diagram showing a mutual relationship between an electric home appliance and a gateway processor in a conventional home automation system. As shown in FIG. 1, the conventional home automation system comprises an electric home appliance 1 and a gateway processor 4.

The electric home appliance 1 includes a controller 2 controlling the entire operation of the appliance, and a power line modem 3 connected to a power line PL to perform communication through the power line PL. Both the controller 2 and power line modem 3 are connected to each other through a low speed communication line (for example, a Universal Asynchronous Receiver/Transmitter: UART) to perform mutual communication therebetween. The electric home appliance 1 can be, for example, an air conditioner, a television, a microwave oven, or a washing machine, or a plurality of electric home appliances connected to each other.

The gateway processor 4 includes a power line modem 5 to communicate with the electric home appliance 1 through the power line PL, and a controller 6 to analyze an activation instruction (for example, typically user execution instructions controlling appliance functions/status) received from a user and to transmit the activation instruction through the power line modem 5.

The gateway processor 4 is connected to a plurality of electric home appliances through the power line PL to perform mutual communication therebetween using a contracted communication protocol so as to transmit activation instructions from the user to corresponding electric home appliances. Further, the gateway processor 4 transmits data through the power line PL, in which an activation instruction code corresponding to each activation instruction is attached to each identification code discriminating electric home appliances. Accordingly, each electric home appliance analyzes the identification code, recognizes an activation instruction therefor, and is activated.

Figure 2:
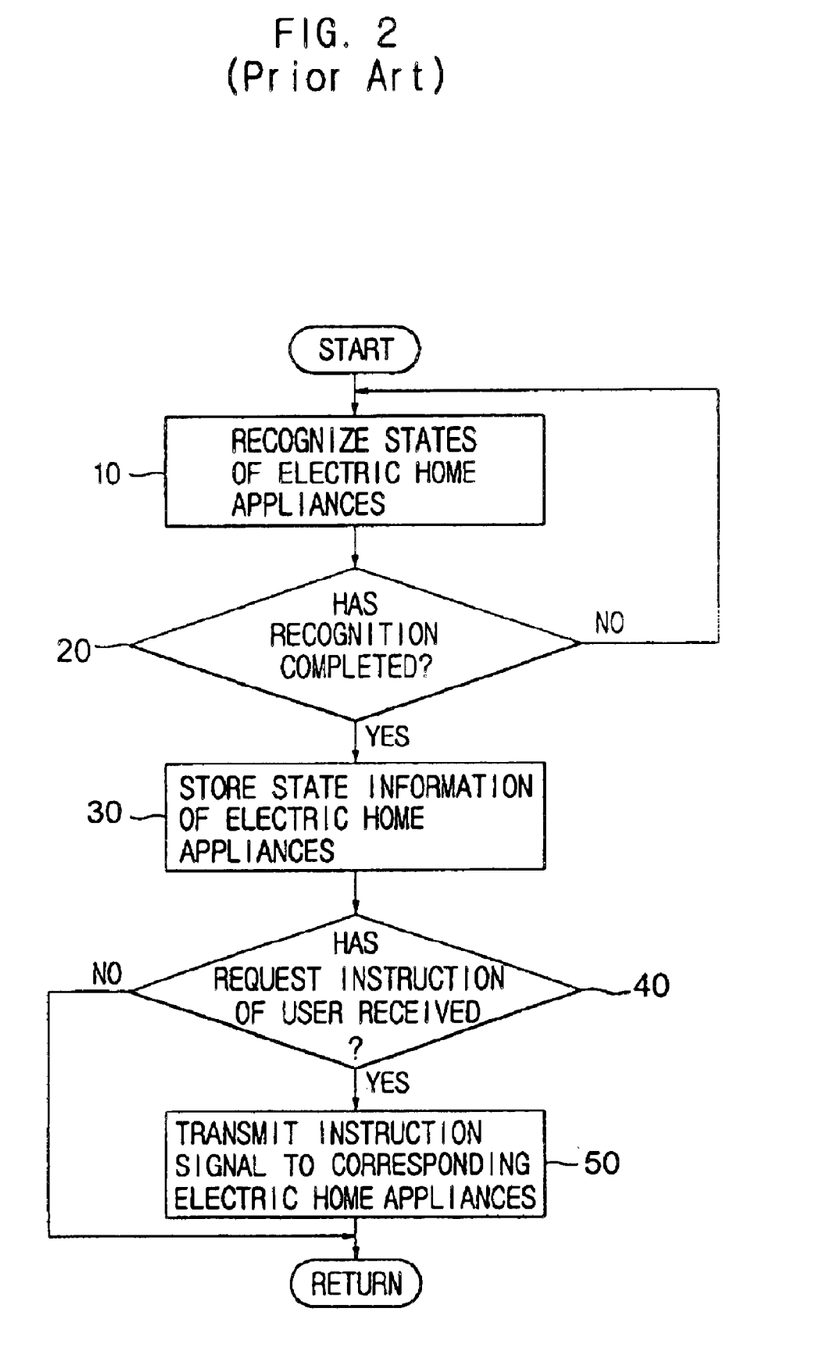
FIG. 2 is a flowchart of a method of controlling activation of the conventional home automation system shown in FIG. 1.

The operation of the gateway processor 4 is described in detail with reference to FIG. 2. First, the gateway processor 4 can recognize operation states of a plurality of electric home appliances connected to the power line PL. In this case, the gateway processor 4 transmits inspection signals to the electric home appliances, and at operation 10 recognizes the entire states of the electric home appliances, such as the supply of power to the electric home appliances or their activation states, on the basis of signals which are received from the electric home appliances in response to the inspection signals.

At operation 20, the gateway processor 4 determines whether the process of recognizing the states of all electric home appliances has been completed. If, at operation 20 the recognizing process is not completed, the gateway processor 4 returns to operation 10 to continuously recognize the states of the electric home appliance. If, at operation 20 the recognizing process has been completed, at operation 30 the gateway processor 4 stores state information of the recognized electric home appliances in an internal memory.

Then, at operation 40 the gateway processor 4 determines whether an activation instruction activating an electric home appliance has been received from outside, such as from a user. If, at operation 40 an activation instruction is not received, the gateway processor 4 returns to operation 10. If, at operation 40 an activation instruction has been received, at operation 50 the gateway processor 4 transmits the received activation instruction to a corresponding electric home appliance through the power line modem 5. That is, the gateway processor 4 transmits data in which an activation instruction code is attached to an identification code corresponding to the electric home appliance, thus activating the corresponding electric home appliance.

However, in the conventional home automation system, if an activation instruction to activate a corresponding electric home appliance is received, the gateway processor 4 transmits the activation instruction regardless of operations/states of other electric home appliances. Therefore, if a number of electric home appliances remain to be activated (i.e., are in the process of activation) when a new activation instruction is received, a plurality of electric home appliances may be simultaneously activated. In this way, simultaneous activation of a plurality of electric home appliances can unexpectedly generate a counter voltage on the power line PL. Accordingly, the conventional home automation system is problematic in that it can cause malfunction of the electric home appliances and the gateway processor connected to the power line, or damage to the electric home appliances.

Moreover, in the conventional home automation system, since the gateway processor 4 can receive an activation instruction through a computation network such as the Internet, the system can receive activation instructions activating a plurality of electric home appliances, store them temporarily (stack), and continuously transmit the activation instructions to corresponding electric home appliances. Therefore, a plurality of electric home appliances could be simultaneously activated, so the above problems may occur.

SUMMARY OF THE INVENTION

Accordingly, the present invention has been made keeping in mind the above problems occurring in the related art, and an object of the present invention is to provide an apparatus and method of controlling activation of a home automation system, which sequentially activates a plurality of electric home appliances to prevent the electric home appliances from being simultaneously activated.

Additional objects and advantages of the invention will be set forth in part in the description which follows and, in part, will be obvious from the description, or may be learned by practice of the invention.

To accomplish the above and other objects, the present invention provides an apparatus controlling activation of a home automation system which can activate/control a plurality of electric home appliances through a power line, comprising an activation control unit receiving an activation instruction from a user for a first electric home appliance of the plurality of electric home appliances, and activating the first electric home appliance after at least one other electric home appliance of the electric home appliances is activated and a predetermined delay time has elapsed, thus preventing the plurality of electric home appliances from being simultaneously activated.

BRIEF DESCRIPTION OF THE DRAWINGS

The above and other objects, features and other advantages of the present invention will be more clearly understood from the following detailed description of the preferred embodiments taken in conjunction with the accompanying drawings, in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
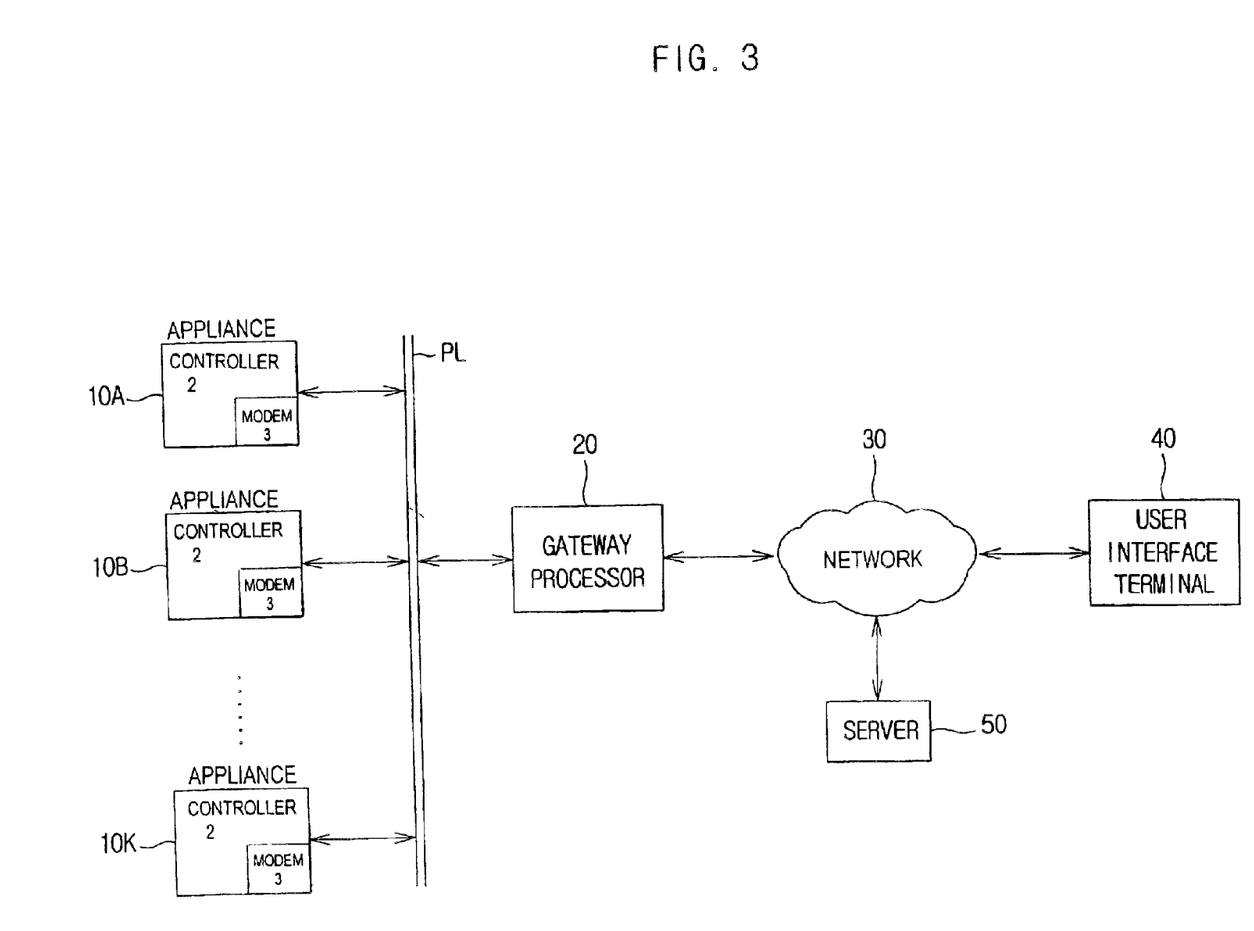
FIG. 3 is a block diagram of an apparatus controlling activation of a home automation system according to an embodiment of the present invention.

FIG. 3 is a block diagram of an apparatus controlling activation of a home automation system according to an embodiment of the present invention, wherein a plurality of electric home appliances 10A, 10B and 10K and a gateway processor 20 are connected to a power line PL, while the gateway processor 20 and a user interface terminal 40 are connected to network 30 and the gateway processor 20 and the user interface terminal 40 are in communication via the network 30. The network 30 can be any known network, such as the Internet or the Intranet.

The electric home appliances 10A, 10B and 10K each have a power line modem 3 connected to the power line PL to perform communication with the gateway processor 20 through the power line PL, and a controller 2 controlling operations of each electric home appliance, respectively. In this case, the controller and the power line modem mutually communicate with each other using a low speed communication line (for example, UART).

The gateway processor 20 includes a power line modem (not shown) to perform communication with the electric home appliances 10A, 10B and 10K through the power line PL, and a controller (not shown) to analyze user execution instructions received through, for example, the Internet 30 and transmit the analyzed user execution instructions to the electric home appliances 10A, 10B and 10K. In particular, processes of the invention can be implemented/embodied in software and/or computing hardware. For example, the gateway processor 20 and described components thereof can be implemented as a computer system that includes storage, such as magnetic and optical discs, RAM, ROM, ASICs, etc. on which processes of the invention can be stored, the processes controlling the computer system and producing results according to the invention.

The user interface terminal 40 receives control instructions to control the electric home appliances 10A, 10B and 10K from outside, such as from a user. In this case, the control instructions can typically contain instructions regarding supply of power to each electric home appliance, setting of given functions and activation and inactivation of the functions. The user interface terminal 40 can be realized as any computing device, such as a personal computer or a personal digital assistant (PDA), having a protocol communicating with the network 30, such as the Internet, or a Web pad having a connection port accessing the network 30.

Using the Internet as an example network 30, if the user inputs activation instructions activating the electric home appliances 10A, 10B and 10K through the user interface terminal 40, the input activation instructions are transmitted to the gateway processor 20 through the Internet 30. The gateway processor 20 analyzes each activation instruction and transmits data to a corresponding electric home appliance through the power line modem (not shown) in the gateway processor 20, in which the data can comprise an activation instruction code corresponding to the activation instruction attached to an identification code of a corresponding electric home appliance.

The gateway processor 20 can recognize the states of the electric home appliances 10A, 10B and 10K. That is, when any activation instruction activating a first electric home appliance remains in standby for execution, if an activation instruction for another electric home appliance is received, the gateway processor 20 stands by without transmitting the activation instruction to another electric home appliance until the first electric home appliance is activated (i.e., is in an active/function executed state). Then, when a predetermined period of time elapses after the gateway processor 20 transmits the activation instruction to the first electric home appliance, that is, only if it is determined that there is no outstanding activation instruction to transmit (i.e., the first electric home appliance has been activated), the gateway processor 20 transmits the other received activation instruction to the other electric home appliance. In this way, the gateway processor 20 sequentially transmits activation instructions to a plurality of electric home appliances, thus preventing generation of a counter voltage due to simultaneous activation of a plurality of electric home appliances.

The gateway processor 20 can set a delay time for each electric home appliance. When a set delay time elapses after transmitting an activation instruction to an electric home appliance, the gateway processor 20 transmits another activation instruction to another electric home appliance. The delay time can be changed using a server system 50 and/or via the user interface terminal 40 connected to the Internet 30.

Figure 4:
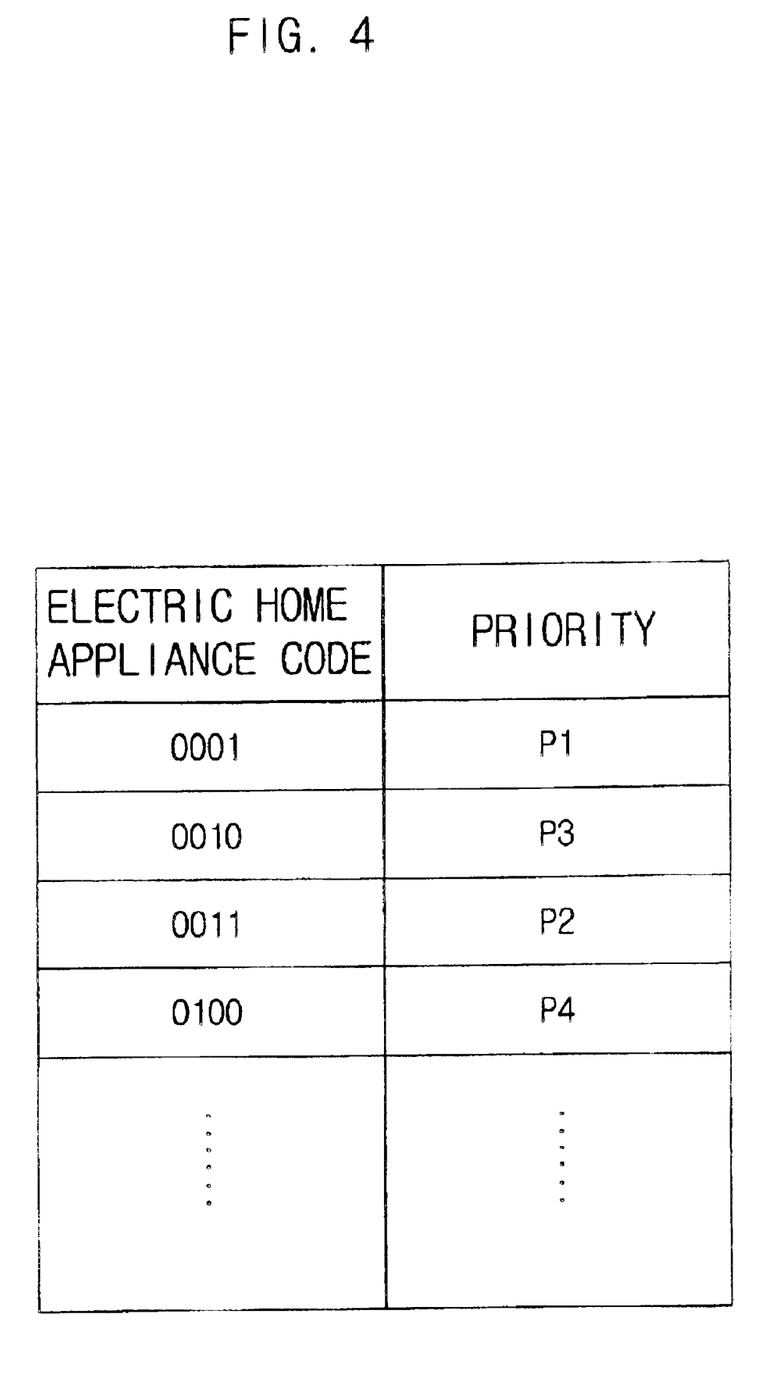
FIG. 4 is a table showing priorities corresponding to electric home appliances according to the present invention.

Further, if the gateway processor 20 receives activation instructions activating different electric home appliances through the Internet 30, that is, if electric home appliances to be activated are plural, the gateway processor 20 can store the received activation instructions temporarily (stack). In this case, the gateway processor 20 determines an electric home appliance to which an activation instruction is to be first transmitted, according to priorities (P1, P2, P3, P4, . . . ) corresponding to codes assigned to the electric home appliances. After the activation instruction is first transmitted to the determined electric home appliance, and then the delay time set for the determined electric home appliance lapses, the gateway processor 20 transmits an activation instruction to an electric home appliance next in priority. The priority can be changed using the server system 50 and/or via the user interface terminal 40. The gateway processor 20 has a table in which the priority corresponding to each electric home appliance can be listed, as shown in FIG. 4.

Figure 5:
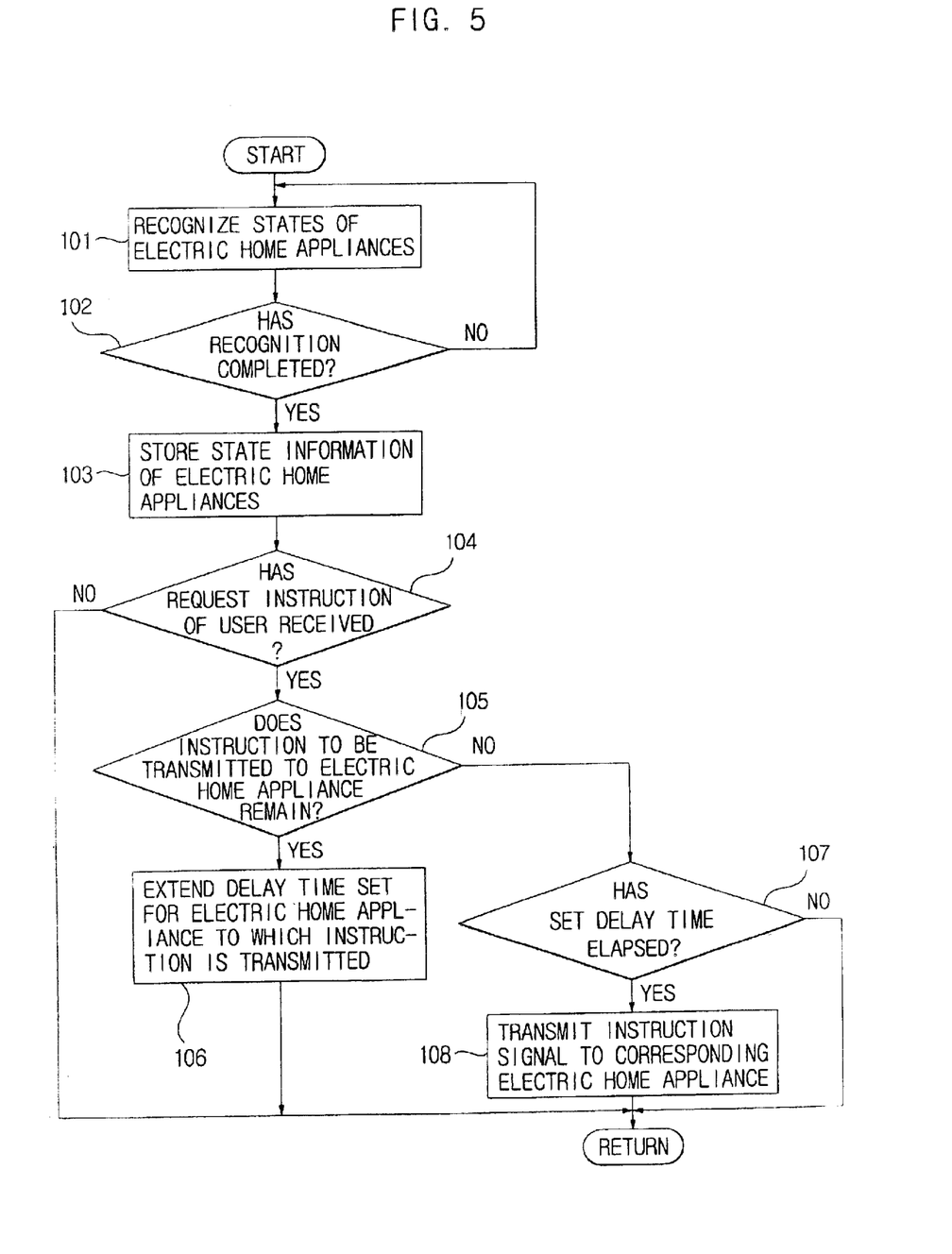
FIG. 5 is a flowchart of a method of controlling activation of a home automation system according to an embodiment of the present invention.

Hereinafter, a method of controlling activation of a home automation system of the present invention is described in detail. FIG. 5 is a flowchart of a method of controlling activation of the home automation system according to an embodiment of the present invention.

First, at operation 101, the gateway processor 20 transmits inspection signals to a plurality of electric home appliances 10A–10K connected to the power line PL, and recognizes states of power supply to the electric home appliances or their activation/function/status states, on the basis of signals received from the electric home appliances in response to the inspection signals.

At operation 102, the gateway processor 20 determines whether the process of recognizing the states of all electric home appliances has been completed. If at operation 102 the recognizing process is not completed according to a determination result, the gateway processor 20 continues to recognize the states of the electric home appliances. If at operation 102 the recognizing process has been completed, at operation 103 the gateway processor 20 stores the state information of recognized electric home appliances in an internal memory.

Then, at operation 104 the gateway processor 20 determines whether an activation instruction to activate an electric home appliance (set A) has been received through the Internet 30. If at operation 104 the activation instruction is not received, the gateway processor 20 continues at operation 101 with the activation control process.

If at operation 104 the activation instruction has been received, at operation 105 the gateway processor 20 determines whether an outstanding activation instruction remains to activate another electric home appliance (set B). If at operation 105 an activation instruction to be transmitted to the electric home appliance (set B) remains in standby for execution according to the determination result, at operation 106 the gateway processor 20 extends a delay time set for the electric home appliance (set B) to prevent undesirable effects due to possible simultaneous activation of the electric home appliances. After extending the set delay time at operation 106, the gateway processor 20 continues at operation 101 with the activation control process so as to transmit any other remaining activation instructions.

If at operation 105 the activation instruction to be transmitted to the electric home appliance (set B) does not remain in standby for execution according to the determination result, at operation 107 the gateway processor 20 determines whether the delay time set for the electric home appliance (set B) has elapsed. If at operation 107 the delay time has not elapsed, the gateway processor 20 continues at operation 101 with the activation control process to stand by for the delay time. If at operation 107 the delay time has elapsed according to the determination result, since there is no concern for simultaneous activation of the electric home appliances, at operation 108 the gateway processor 20 transmits the activation instruction received through the Internet 30 to the electric home appliance (set A) through the power line modem (not shown), and continues at operation 101 with the activation control process.

Figure 6:
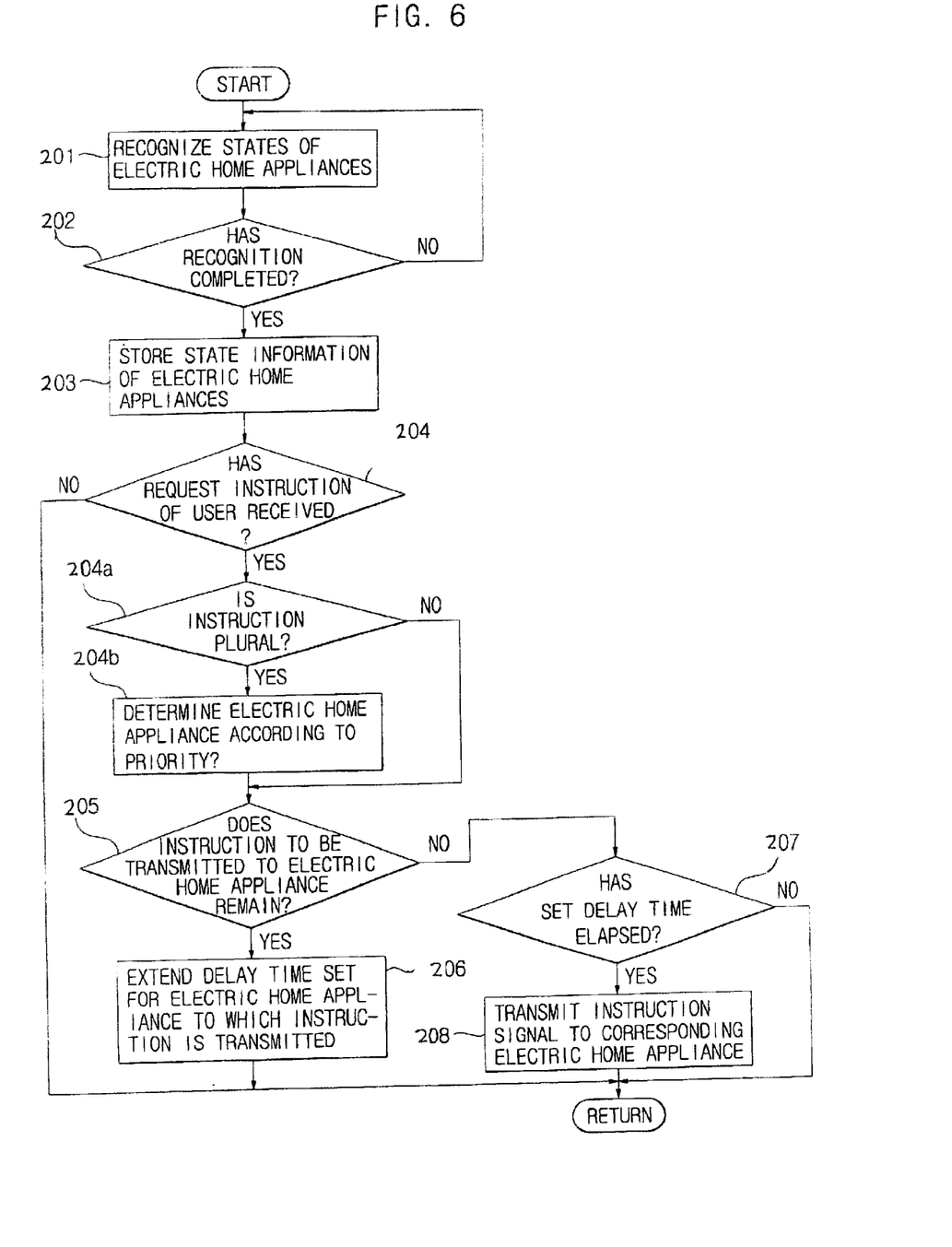
FIG. 6 is a flowchart of another method of controlling activation of a home automation system according to another embodiment of the present invention.

FIG. 6 is a flowchart of another method of controlling activation of the home automation system according to another embodiment of the present invention. Here, the process of FIG. 6 is the same as that of FIG. 5 except for an operation determining an electric home appliance to which an activation instruction is to be transmitted according to a priority when a plurality of activation instructions are received.

First, at operation 201 the gateway processor 20 transmits inspection signals to a plurality of electric home appliances 10A–10K connected to the power line PL, and recognizes states of the electric home appliances on basis of signals received from the electric home appliances in response to the inspection signals.

At operation 202, the gateway processor 20 determines whether the process of recognizing the states of all electric home appliances has been completed. If at operation 202 the recognizing process is not completed according to a determination result, the gateway processor 20 continues at operation 201 with recognizing the states of the electric home appliances. If at operation 202 the recognizing process has been completed, at operation 203 the gateway processor 20 stores the state information of the recognized electric home appliances in an internal memory.

Then, at operation 204 the gateway processor 20 determines whether an activation instruction to activate an electric home appliance has been received through the Internet 30. If the activation instruction is not received, the gateway processor 20 continues at operation 201 with the activation control process.

If at operation 204 the activation instruction has been received, at operation 204*a* the gateway processor 20 determines whether user execution instructions for a plurality of electric home appliances, for example, two electric home appliances (set A and set C) have been received. This can be a case where the user interface terminal 40 simultaneously inputs activation instructions in a short time, or where activation instructions for electric home appliances are received in a very short time during transmission of activation instructions through the Internet 30. At operation 204*a* the gateway processor 20 temporarily stores (stacks) the received activation instructions.

In this way, at operation 204*a* the gateway processor 20 determines whether the received activation instruction is plural. If at operation 204*a* the activation instruction is plural, the gateway processor 20 searches a priority table to determine an electric home appliance to which an activation instruction is to be first transmitted according to priority information of the electric home appliances in the priority table, and at operation 204*b* determines an electric home appliance of highest priority. For example, with reference to FIG. 4 if priority P1 of the electric home appliance (set A) is higher than P2 of another electric home appliance (set C), the gateway processor 20 first transmits the activation instruction to the electric home appliance (set A).

If at operation 204*a* there is a single activation instruction, or when at operation 204*b* an electric home appliance of highest priority is determined, at operation 205 the gateway processor 20 determines whether an activation instruction to be transmitted to an electric home appliance (set B) remains in standby for execution. If at operation 205 the activation instruction to be transmitted to the electric home appliance (set B) remains in standby for execution according to the determination result, at operation 206 the gateway processor 20 extends a delay time set for the electric home appliance (set B) so as to prevent possible undesirable effects due to simultaneous activation of the home electric appliances. After extending the set delay time at operation 206, the gateway processor 20 continues at operation 201 with the activation control process so as to transmit the other remaining activation instructions.

If at operation 205 the activation instruction to be transmitted to the electric home appliance (set B) does not remain in standby for execution according to the determination result, at operation 207 the gateway processor 20 determines whether the delay time set for the electric home appliance (set B) has elapsed. If at operation 207 the delay time has not elapsed, the gateway processor 20 continues at operation 201 with the activation control process to stand by for the delay time. If at operation 207 the delay time has elapsed according to the determination result, since there is no concern for simultaneous activation of the home electric appliances, at operation 208 the gateway processor 20 transmits the activation instruction received through the Internet 30 to the electric home appliance (set A) through the power line modem (not shown), and continues at operation 201 with the activation control process.

In the above embodiment, a method of setting a delay time per electric home appliance is adopted; however, the delay time can be set to be different per set of user execution instructions for the same electric home appliance if necessary. Further, the delay time can be set to be different according to various electric home appliances. Although the delay time is more divisionally set in this way, those skilled in the field can understand that the spirit of the present invention can be equally applied, without the detailed description.

Further, those skilled in the field can easily understand that the delay times of electric home appliances and priorities thereof set in the gateway processor 20 can be set to be changed through the server computer 50 and/or the user interface terminal 40.

As described above, when an activation instruction to be transmitted to an electric home appliance remains in standby for execution (i.e., outstanding or in progress), if another activation instruction for activating another electric home appliance is received, the present invention extends a delay time set for the electric home appliance with the outstanding activation instruction in standby for execution, using a gateway processor 20. After the extended delay time elapses, the present invention transmits the activation instruction to the other electric home appliances, thus preventing two or more electric home appliances from being simultaneously activated. Further, since the gateway processor 20 can receive activation instructions through the Internet, even though a plurality of activation instructions can be temporarily stored in the gateway processor, the present invention adopts a method in which the gateway processor first transmits an activation instruction to an electric home appliance with a highest priority, thereby preventing simultaneous activation of a plurality of electric home appliances by ensuring sequential activation of the electric appliances.

As described above, the present invention provides an apparatus and method of controlling activation of a home automation system, which can eliminate undesirable effects in which both electric home appliances and a gateway processor can malfunction or are damaged due to a counter voltage caused by simultaneous activation of a plurality of electric home appliances connected to a power line, thus increasing the reliability of a home automation system.

Although the preferred embodiments of the present invention have been disclosed for illustrative purposes, those skilled in the art will appreciate that various modifications, additions and substitutions are possible, without departing from the scope and spirit of the invention the scope of which is defined in the claims and their equivalents.

What is claimed is:

1. An apparatus controlling activation of a home automation system which controls a plurality of electric home appliances through a power line, comprising:

an activator receiving an activation instruction for a first electric home appliance of the plurality of electric home appliances from a user, and activating the first electric home appliance via the power line after at least one other electric home appliance of the electric home appliances is activated via the power line and a lapse of a predetermined delay time, preventing the plurality of electric home appliances from being simultaneously activated, wherein when the activation instruction for the first electric home appliance is received, the activator confirms whether a previous activation instruction remains in standby for execution for the other electric home appliance, extends a delay time of the other electric home appliance if the previous activation instruction remains in standby for execution, and activates the first electric home appliance after the lapse of the extended delay time.

2. The activation control apparatus of a home automation system according to claim 1, wherein the activator receives the activation instruction through a computation network.

3. The activation control apparatus of a home automation system according to claim 1, wherein the activator stores delay times corresponding to the plurality of electric home appliances.

4. The activation control apparatus of a home automation system according to claim 1, wherein the activator activates the electric home appliances according to priorities assigned to each electric home appliances upon receiving activation instructions activating a plurality of different ones of the electric home appliances.

5. The activation control apparatus of a home automation system according to claim 1, further comprising a server connected to the activator through a network and the server changing the delay times and activation priorities of the electric home appliances.

6. A method of controlling activation of a home automation system which prevents a plurality of electric home appliances from being simultaneously activated when controlling a plurality of electric home appliances through a power line, comprising:

receiving an activation instruction for a first electric home appliance of the plurality of electric home appliances from a user;

assigning activation delay times corresponding to the plurality of electric home appliances;

activating the first electric home appliance through a first signal on the power line after at least one other electric home appliance of the electric home appliances is activated through a second signal on the power line and a lapse of a first activation delay timer;

determining whether at least one other electric home appliance is prearranged to be activated or in progress of activation; and extending the first activation delay time corresponding to the first electric home appliance if the at least one other electric home appliance is prearranged to be activated or in progress of activation, and activating the first electric home appliance after a lapse of the extended first activation time.

7. The activation control method according to claim 6, further comprising activating the plurality of electric home appliances according to assigned priorities of each electric home appliance upon activation instructions activating a plurality of different ones of the electric home appliances are received.

8. A home automation system comprising:

a power line network;

home appliances in communication with the power line network; and an appliance controller in communication with the home appliances via the power line network and sequentially controlling the home appliances responsive to control instructions by communicating with a first home appliance after communication with at least one other home appliance is completed and a lapse of a predetermined delay time, wherein the controller prevents simultaneous communication via the power line network with two more of the home appliances, and the appliance controller is further in communication with a data network and receives the control instructions changing the predetermined delay time via the data network from other systems.

9. The system of claim 8, wherein priorities determine a communication order with the home appliances.

10. The system of claim 8, wherein the data network is the Internet.

11. A computer readable storage controlling a home appliance controller on a power line network by a process, comprising:

receiving control instructions for a first home appliance;

communicating, via the power line network, with the first home appliance using the control instructions after communication with at least one other home appliance is completed and a lapse of a predetermined delay time; and receiving, via a network, commands changing the predetermined delay time, thereby preventing simultaneous communication on the power line with two or more home appliances.

* * * * *